United States Patent [19]
Spencer et al.

[11] 3,803,070
[45] Apr. 9, 1974

[54] LITHOGRAPHIC PRINTING

[75] Inventors: Alexander Spencer; Leonard Alfred Spicer, both of London, England

[73] Assignee: Gestetner Limited, London, England

[22] Filed: May 4, 1970

[21] Appl. No.: 34,581

Related U.S. Application Data

[63] Continuation of Ser. No. 673,946, Oct. 9, 1967, abandoned.

[30] Foreign Application Priority Data

Oct. 14, 1966 Great Britain.................. 46065/66

[52] U.S. Cl. ............... 260/29.6 S, 106/20, 106/25, 106/26
[51] Int. Cl. ...................... C08f 45/24, C08d 11/00
[58] Field of Search ................. 106/19–32; 101/465, 468, 466, 455, 453–470; 260/29.6 S

[56] References Cited
UNITED STATES PATENTS

| | | | |
|---|---|---|---|
| 2,291,293 | 7/1942 | Curtis | 106/20 |
| 2,868,741 | 1/1959 | Chambers et al. | 106/26 X |
| 2,876,119 | 3/1959 | Dithmar et al. | 106/20 |
| 3,074,800 | 1/1963 | Germann | 106/22 |
| 3,079,270 | 2/1963 | Cortez | 106/27 X |
| 3,079,309 | 2/1963 | Wainer | 106/23 X |
| 3,234,873 | 2/1966 | Miller | 101/455 X |
| 3,250,214 | 5/1966 | Bricknell | 101/465 X |
| 3,264,142 | 8/1966 | Wainer | 106/28 X |
| 3,315,599 | 4/1967 | Lind | 101/467 X |
| 3,351,008 | 11/1967 | Lincoln et al. | 101/465 |
| 2,780,168 | 2/1957 | Nichols | 101/465 |
| 3,513,000 | 5/1970 | Vranchen et al. | 106/31 |
| 3,615,750 | 10/1971 | Blair | 106/27 |
| 3,615,791 | 10/1971 | Thomas et al. | 101/465 X |
| 2,090,704 | 8/1934 | Rowell | 106/24 |

Primary Examiner—Harry Wong, Jr.
Attorney, Agent, or Firm—Cushman, Darby & Cushman

[57] ABSTRACT

Lithographic ink is suspended in a hydrophilic medium of high viscoity at low rates of shear and relatively low vscosity at high rates of shear to give a suspension which can be used in lithographic printing without water or fountain solution.

16 Claims, No Drawings

LITHOGRAPHIC PRINTING

This is a continuation of application Ser. No. 673,946, filed Oct. 9, 1967, and now abandoned.

This invention relates to lithographic printing, and more particularly to lithographic printing inks which can be used without water or fountain solution.

In lithographic printing, the lithographic plate is contacted alternately with the greasy lithographic printing ink and an aqueous medium, which may be water, when metal plates are used, but is usually an aqueous solution called fountain solution, containing so-called "desensitizers" designed to prevent the non-imaged, hydrophilic background of the lithographic plate from accepting the greasy ink. The need to contact the plate alternately with the two materials is inconvenient both because of the elaborate machinery that is required and the opportunities that are provided for operator error. Many attempts have therefore been made to devise lithographic printing inks which can be used without water or fountain solution, but none of the proposals heretofore made have been satisfactory.

The present invention provides a lithographic ink preparation, which can be used without water or fountain solution, in the form of a suspension of (i) a greasy lithographic printing ink, in (ii) a hydrophilic phase having a shear-dependent viscosity of at least 6, and preferably at least 20, poises at low rates of shear falling to less than 6, and preferably less than 2, poises at high rates of shear. These viscosities may be determined, at about 20°-25°C. for example, on the Shirley-Ferranti Cone and Plate Viscometer, the viscosity at low rates of shear being measured at 5 r.p.m. and that at high rates of shear at 1,000 r.p.m.

When such a suspension is used on a conventional lithographic printing machine, the machine shears the suspension releasing the hydrophilic phase onto the hydrophilic areas of the plate and the greasy ink particles onto the oleophilic image areas of the plate. No other means is required for preventing scumming of the plate (i.e. adherence of ink to the non-image areas).

It is essential that the viscosity of the hydrophilic phase be markedly shear dependent. Mere thickening of the phase is not enough. Generally speaking, the hydrophilic phase should have a viscosity of 25 to 200 poises at 5 r.p.m. on the Shirley-Ferranti Cone and Plate Viscometer, falling to 4 to 20 poises at 50 r.p.m., 1 to 5 poises at 300 r.p.m., and 0.1 to 2 poises at 1,000 r.p.m. If this condition is satisfied, the suspension gives satisfactory results.

The hydrophilic phase may be based on water or a liquid polyhydric alcohol, such as ethylene glycol, propylene glycol, diethylene glycol, or glycerin, or a mixture thereof. Since liquid polyhydric alcohols act as humectants to prevent rapid drying of the hydrophilic areas of the lithographic plate, it is generally desirable to use them alone, or mixed with water, as the liquid constituent of the hydrophilic phase. For paper plates, a mixture of 95% to 50% water and 5% to 50% hygroscopic polyhydric alcohol is preferably used.

The nature of the agents used to impart the requisite viscosity characteristics to the hydrophilic phase depends on the nature of the liquid constituents of that phase. Thus, when a liquid polyhydric alcohol alone is used without admixture of water, the agent is preferably finely divided silica aerogel having a specific surface of at least 50 sq. metres, preferably 150 to 300 sq. metres, per gram, used generally in a proportion of 5 to 50% by weight of the hydrophilic phase. Such finely divided silicas are available commerically, for example under the registered Trade Marks "Aerosil" (Degussa) and "Santocel" (Monsanto). They generally have a particle size of 0.01 to 0.02 microns. The best amount of silica to use varies somewhat with the precise physical nature of the silica, but can readily be found by routine experiment.

Another suitable agent is a high molecular weight vinyl polymer containing free carboxyl groups, e.g. that sold under the Trade Mark "Carbopol" (Goodrich), neutralized with a base, e.g. triethanolamine or sodium hydroxide. 1 to 12% by weight of the hydrophilic phase is a suitable proportion of the polymer and the amount of base should be such as to give a pH of 5.5 to 11. Carbopol is a highly ionic slightly acidic high molecular weight substantially water — and organic solvent — insoluble vinyl polymer containing free carboxyl groups. As indicated, the free carboxyl groups are neutralized with a base so as to cause the hydrophilic phase of the lithographic ink to gel.

When the major constituents of the hydrophilic phase are water and a polyhydric alcohol, the phase preferably contains a lithographic desensitizer. Such desensitizers are well known in the art. A desensitizer may be a single substance, e.g. sodium hexametaphosphate, but is more usually a combination of a desensitizing gum and an acidic substance. The desensitizing gum is ordinarily a polymeric organic carboxylic acid in the form of a metal salt, e.g. gum arabic, sodium carboxymethyl cellulose, or ammonium or sodium alginate. The acidic substance is ordinarily an alkali metal or ammonium acid phosphate or orthophosphoric acid itself. The requirements for a satisfactory desensitizer are well understood in the art and are described, for example, in "Chemistry of Lithography", Hartsuch, Lithographic Technical Foundations Inc., New York, N.Y., (1952) and the references mentioned therein.

The lithographic desensitizer in the aqueous polyhydric alcohol used in the suspensions of this invention is ordinarily present in a concentration of 0.1 to 10% by weight. It may be any of the single substances or combination of substances heretofore used as lithographic desensitizers. Suitable such substances are gum arabic, sodium carboxymethyl cellulose or ammonium alginate, in combination with phosphoric acid or an acid water-soluble phosphate salt, e.g. ammonium dihydrogen phosphate. Other known lithographic desensitizers can be used, however.

The polyhydric alcohol, may be, e.g., propylene glycol, diethylene glycol, glycerin or a hygroscopic saccharide such as sucrose or sorbitol, but is preferably ethylene glycol.

The appropriate viscosity characteristics may be imparted to the aqueous polyhydric alcohol by, e.g., natural gum such as gum tragacanth, water-soluble cellulose derivatives, such as sodium carboxymethyl cellulose and hydroxyethyl cellulose, high viscosity alginates, high viscosity starches, and wholly synthetic polymeric materials such as the vinyl polymers containing carboxylic acid groups mentioned above. The thickener may be added in any concentration such that the aqueous solution has the requisite viscosity characteristics. Ordinarily the concentration of thickener is 2 to 10% by weight of the hydrophilic phase.

It is also advantageous to include in the aqueous phase, in a proportion of from 5 to 30% by weight, a water-miscible organic liquid, e.g. acetone, isopropyl alcohol or ethanol. Such a liquid acts as a spreading agent when the dispersion is applied to the lithographic printing plate, and thus improves the qualities of the printed copies obtained.

The lithographic printing ink used can be a conventional lithographic varnish-based ink containing carbon black or a coloured pigment or dye as colouring agent, and containing the conventional wetting agents, e.g. gilsonite and copper oleate, and driers, e.g. cobalt or lead linoleate or naphthenate. Suitable formulations are given below.

The relative proportions of the mixture of the hydrophilic phase and the greasy lithographic ink can be varied over a wide range consistent with the greasy ink forming the discontinuous phase in the suspensions obtained. Ordinarily from 5 to 60% by weight of the mixture is made up of the greasy lithographic ink.

The hydrophilic phase is conveniently mixed with the greasy lithographic ink simply by stirring the two together. As already indicated, in the suspension the lithographic ink forms a discontinuous, hydrophobic phase, suspended in the continuous hydrophilic phase.

In using the suspensions of this invention, the lithographic plate must first be "etched" in the conventional manner to render the non-image areas ink-repellent, but after this has been done, it is unnecessary to use water or any fountain solution, as the ink mixture of the present invention can be applied repeatedly to the imaged lithographic printing plate without the hydrophilic areas of the printing plate accepting any of the greasy lithographic ink ("scumming"). This means that the lithographic printing machine no longer requires the elaborate machinery which constitutes the fountain system of offset lithographic printing machines. The fountain trough and rollers to carry and distribute fountain solution with the necessary drive mechanism are not needed on a lithographic printing machine using the ink system of the present invention. Large runs of high quality copies can be carried out using the ink mixture of the present invention, and the background areas of the printing plate remain free from ink. Moreover, suspensions which are stable to storage can easily be made.

Examples of suspensions of lithographic printing inks in accordance with the invention are as follows. Parts are by weight.

EXAMPLE 1

Ethylene glycol (50 parts) was mixed with finely divided silica (Santocel Z of specific surface area 280 sq. metres per gram; 7 parts) until a smooth shear dependent paste was obtained. A conventional alkyd-based greasy lithographic printing ink (25 parts) was then stirred into the mixture of ethylene glycol and silica until a homogeneous dispersion was obtained in which the lithographic ink formed the discontinuous phase, and the ethylene glycol/silica mixture the continuous phase. This mixture can be used as a lithographic printing ink in the manner described above and a large number of high quality copies obtained.

In this composition, the Santocel Z can be replaced by like amount of Aerosil Standard.

EXAMPLE 2

Ethylene glycol (68 parts) was mixed with finely divided silica (Santocel C of specific surface area 180 sq. metres per gram; 20 parts) to give a shear dependent paste. A lithographic ink of the formulation given below (30 parts) was then stirred into the paste to give a homogeneous dispersion. The latter can be used as lithographic printing ink in the manner already described, and a large number of high quality copies obtained.

The lithographic printing ink used in Examples 1 and 2 had the composition:

| | |
|---|---|
| Long Flow Carbon Black | 32 parts by weight |
| Blue Toner | 10 parts by weight |
| Extender (Blanc Fixe) | 25 parts by weight |
| Lithographic Low Viscosity Stand Oil (3–15 poises) | 31 parts by weight |
| Synthetic Oleo-resin Varnish | 81 parts by weight |
| Cyclised Rubber Solution (approx. 46% solids) | 19 parts by weight |
| Copper Oleate | 2 parts by weight |

EXAMPLE 3

Ethylene glycol (100 parts) was heated and mixed with Carbopol 934 (2 parts) and the mixture stirred until the "Carbopol" had dissolved. Triethanolamine (4 parts) or 10% aqueous sodium hydroxide solution (4 parts) is then added and mixed in. After cooling, a conventional lithographic ink (33 parts) was dispersed in the thickened mixture to give a homogeneous dispersion which can be used as a lithographic printing ink.

EXAMPLE 4

Ammonium dihydrogen phosphate (1.4 parts) and low viscosity sodium carboxymethyl cellulose (1.1 parts) are dissolved in water (282.0 parts) and ethylene glycol (113.0 parts) is added. The solution is then heated to 70°C. and gum tragacanth (20 parts) is added, and the solution stirred till all is dissolved. The viscous mixture is then cooled and acetone (50 parts) and phenol (2.2 parts) are stirred in. A conventional lithographic ink (100 parts) is then added and dispersed in the aqueous phase with a high speed turbo disperser.

EXAMPLE 5

Ammonium dihydrogen phosphate (0.4 parts) and low viscosity sodium carboxymethyl cellulose (0.3 parts) are dissolved in water (252.0 parts) and ethylene glycol (28 parts) is added. The solution is heated to 70°C. and high viscosity ammonium alginate (sold as Manucol F 331, 18 parts) is added, and the solution stirred till all is dissolved. The viscous mixture is then cooled and phenol (0.5 part) is stirred in. A conventional lithographic ink (100 parts) is then added and dispersed in the aqueous phase with a high speed turbo disperser.

EXAMPLE 6

The procedure of Example 5 is repeated using high viscosity soluble starch (sold as Stadex DI/223 by Starch Products Co. Ltd., 18 parts) in place of the high viscosity ammonium alginate. A similar but rather more viscous product is obtained.

EXAMPLE 7

Ammonium dihydrogen phosphate (1.1 parts) and low viscosity sodium carboxymethyl cellulose (0.8 part) are dissolved in water (202.0 parts) and ethylene glycol (80.8 parts) is added. The solution is then heated to 70°C. and Carbopol 934 (8.2 parts; a vinyl polymer containing carboxyl groups sold by Goodrich Chemical Company) is added and the solution stirred till all is dissolved. Triethanolamine (5.4 parts) is then added and when thickening is complete, the viscous mixture is cooled and phenol (1.6 parts) is stirred in. Lithographic ink (100 parts) is then added and dispersed in the aqueous phase with a high speed turbo disperser.

The lithographic printing ink used in Examples 3 to 7 has the following composition:

| | |
|---|---|
| Long flow carbon black | 45 parts |
| Blue Toner | 7 parts |
| Lithographic Medium Viscosity Stand Oil (20–50 poises) | 50 parts |
| Lithographic Low Viscosity Stand Oil (3–15 poises) | 15 parts |
| Lithographic High Viscosity Stand Oil (1,000–10,000 poises) | 10 parts |
| Cobalt Drier (containing 6% by weight of cobalt calculated as metal) | 1.5 parts |
| Copper Oleate | 2 parts |
| Cyclised Rubber Solution (containing 46% by weight of solids) | 10 parts |
| Bitumen Solution (containing 65% by weight of solids dissolved in a petroleum fraction of high boiling point) | 4.5 parts |

These ingredients are mixed together until a homogeneous composition is obtained.

The viscosity characteristics of the hydrophilic phases of Examples 1 and 4 to 7, as determined at about 20°C. on the Shirley-Ferranti Cone and Plate Viscometer at the indicated speeds as follows:

| | Viscosity in poises at | | | |
|---|---|---|---|---|
| Example No. | 5 rpm | 50 rpm | 300 rpm | 1000 rpm |
| 1 using Santocel 2 | 36 | – | – | 5.9 |
| 1 using Aerosil Standard | 160 | 16.7 | 4.4 | 1.8 |
| 4 | 27.8 | 4.5 | 1.4 | 0.3 |
| 5 | 6.9 | 3.8 | 1.8 | 1.0 |
| 6 | 48.6 | 9.7 | 2.5 | 1.1 |
| 7 | 41.6 | 10.4 | 3.6 | 1.7 |

The lithographic ink suspensions described in the Examples are especially useful in connection with lithographic printing using paper plates.

What is claimed is:

1. A lithographic ink for lithographing without a separate water or fountain solution comprising a suspension of
   i. a greasy lithographic printing ink as discontinuous phase, in
   ii. a continuous hydrophilic phase comprising water, a liquid hygroscopic polyhydric alcohol or a mixture thereof, the hydrophilic phase having a shear dependent viscosity of 20 to 200 poises at 5 r.p.m. falling to 0.1 to 2 poises at 1,000 r.p.m. as measured on the Shirley-Ferranti cone and plate viscometer, the agent conferring said shear dependent viscosity being a finely divided silica having a specific surface area of at least 50 square meters per gram when the said hydrophilic phase is a liquid polyhydric alcohol and otherwise a high molecular weight soluble polymer selected from the group consisting of: (a) a highly ionic slightly acidic high molecular weight substantially water -and organic solvent-insoluble vinyl polymer containing free carboxyl groups neutralized with a base so as to cause said hydrophilic phase to gel, (b) gum tragacanth, (c) carboxymethyl cellulose, (d) hydroxyethyl cellulose, and (e) high viscosity alginates, and the suspension containing 5–60% by weight of greasy lithographic printing ink (i).

2. A suspension according to claim 1 in which the hydrophilic phase comprises ethylene glycol, propylene glycol, diethylene glycol, or glycerin or a mixture thereof.

3. A suspension according to claim 2 in which the agent conferring the shear dependent viscosity characteristics is finely divided silica aerogel.

4. A suspension according to claim 3 in which the silica aerogel has a specific surface of 150 to 300 sq. metres per gram.

5. A suspension according to claim 3 in which the proportion of silica aerogel is 5 to 50% by weight of the hydrophilic phase.

6. A suspension according to claim 1 in which the proportion of the said vinyl polymer is 1 to 12% by weight of the hydrophilic phase and the amount of base is such as to give a pH of 5.5 to 11.

7. A suspension according to claim 1 in which the hydrophilic phase comprises 95 to 50% by weight of water and 5 to 50% by weight of a hygroscopic polyhydric alcohol.

8. A suspension according to claim 7 in which the said polyhydric alcohol is ethylene glycol.

9. A suspension according to claim 7 in which the hydrophilic phase also comprises a 0.1 to 10% by weight of a lithographic desensitizer.

10. A suspension according to claim 9 in which the lithographic desensitizer is low viscosity sodium carboxymethyl cellulose, ammonium dihydrogen phosphate, or a mixture thereof.

11. A suspension according to claim 7 in which the agent conferring the shear-dependent viscosity characteristics is gum tragacanth, high viscosity ammonium alginate, or said high molecular weight vinyl polymer containing free carboxyl groups neutralized with a base, each in an amount, between 2 and 10% by weight of the hydrophilic phase, sufficient to confer the specified shear-dependent viscosity characteristics.

12. A suspension according to claim 1 which also contains 5 to 30% by weight of the hydrophilic phase of a spreading agent other than an emulsifying agent.

13. A suspension according to claim 12 in which the said spreading agent is isopropyl alcohol or acetone.

14. A suspension according to claim 1 of (i) 5–60% by weight of a greasy lithographic printing ink as discontinuous phase, in (ii) a continuous hydrophilic phase comprising ethylene glycol, propylene glycol, diethylene glycol, or glycerin or a mixture thereof and 5 to 50% by weight of the hydrophilic phase of a finely divided silica aerogel.

15. A suspension according to claim 1 of (i) 5 to 60% by weight of a greasy lithographic printing ink as discontinuous phase, in (ii) a continuous hydrophilic phase comprising 95 to 50% by weight of water, and 5 to 50% by weight of a hydroscopic polyhydric alcohol, and between 2 and 10% by weight of the hydrophilic phase of gum tragacanth, high viscosity ammonium alginate, or said high molecular weight vinyl polymer containing free carboxyl groups neutralised with a base.

16. A suspension according to claim 1 of (i) 5 to 60% by weight of a greasy lithographic printing ink as discontinuous phase, in (ii) a continuous hydrophilic phase comprising ethylene glycol, propylene glycol, diethylene glycol, or glycerin or a mixture thereof and 1 to 12% by weight of the hydrophilic phase of said high molecular weight vinyl polymer containing free carboxyl groups neutralised with a base to give a pH of 5.5 to 11.

* * * * *